United States Patent
Shibamoto et al.

(10) Patent No.: US 7,059,344 B2
(45) Date of Patent: Jun. 13, 2006

(54) DISCHARGE VALVE MECHANISM FOR VARIABLE DISPLACEMENT COMPRESSOR

(75) Inventors: Yoshitaka Shibamoto, Sakai (JP); Hirofumi Higashi, Sakai (JP); Yoshinori Asano, Kusatsu (JP); Takashi Shimizu, Sakai (JP); Kazutaka Hori, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/517,144

(22) PCT Filed: Mar. 5, 2004

(86) PCT No.: PCT/JP2004/002912

§ 371 (c)(1),
(2), (4) Date: Dec. 7, 2004

(87) PCT Pub. No.: WO2004/079193

PCT Pub. Date: Sep. 16, 2004

(65) Prior Publication Data

US 2005/0175494 A1 Aug. 11, 2005

(30) Foreign Application Priority Data

Mar. 5, 2003 (JP) .............................. 2003-057976

(51) Int. Cl.
*F16K 15/00* (2006.01)

(52) U.S. Cl. .................... 137/512.1; 137/512.15; 137/512.14; 137/855; 137/856; 137/857; 417/559; 417/569

(58) Field of Classification Search .......... 137/512.15, 137/512.4, 855, 856, 857; 417/559, 569
See application file for complete search history.

(56) References Cited

U.S. PATENT DOCUMENTS

| | | | | |
|---|---|---|---|---|
| 2,372,938 A | * | 4/1945 | Doeg | 137/512.15 |
| 5,143,027 A | * | 9/1992 | Bergeron | 123/65 V |
| 5,243,934 A | * | 9/1993 | Boyesen | 123/73 V |
| 5,311,902 A | | 5/1994 | Overfield et al. | |
| 5,346,373 A | * | 9/1994 | Riffe | 417/415 |
| 5,355,910 A | * | 10/1994 | Gies et al. | 137/858 |
| 5,885,064 A | | 3/1999 | McCoy | |
| 6,116,866 A | * | 9/2000 | Tomita et al. | 417/413.2 |
| 6,116,874 A | * | 9/2000 | Nation et al. | 417/571 |
| 6,196,815 B1 | | 3/2001 | Ohtake | |
| 6,290,468 B1 | * | 9/2001 | Kato et al. | 417/222.2 |
| 6,474,957 B1 | * | 11/2002 | Kimura et al. | 417/269 |
| 2001/0032676 A1 | * | 10/2001 | Kuroshita et al. | 137/512.15 |

FOREIGN PATENT DOCUMENTS

| | | |
|---|---|---|
| EP | 0699837 A2 | 3/1996 |
| EP | 0723079 A1 | 7/1996 |
| EP | 1002951 | 5/2000 |
| JP | 56-060882 | 5/1981 |

(Continued)

*Primary Examiner*—Cheryl Tyler
*Assistant Examiner*—B. Clayton McCraw
(74) *Attorney, Agent, or Firm*—Global IP Counselors

(57) ABSTRACT

A discharge valve mechanism has a plurality of discharge openings. The discharge openings are placed in an open or closed state by a plate-like valve element. Each of the discharge openings is formed at a respective location between a base end side and a leading end side of the valve element. The number of discharge openings to be placed in the open state is varied depending on the pressure and the flow rate of gas refrigerant discharged from a compression chamber.

8 Claims, 6 Drawing Sheets

FOREIGN PATENT DOCUMENTS

| | | |
|---|---|---|
| JP | 57-168085 | 10/1982 |
| JP | 59-218393 | 12/1984 |
| JP | S59-213956 A | 12/1984 |
| JP | 61-244883 | 10/1986 |
| JP | S61-166183 U | 10/1986 |
| JP | H01-139091 U | 9/1989 |
| JP | 03-175174 | 7/1991 |
| JP | 06-330864 | 11/1994 |
| JP | 09-228951 | 2/1997 |
| JP | 11-166480 | 6/1999 |
| JP | 2001-289254 | 10/2001 |
| JP | 2002-303271 | 10/2002 |

* cited by examiner (a)

(b)

DISCHARGE VALVE MECHANISM FOR VARIABLE DISPLACEMENT COMPRESSOR

TECHNICAL FIELD

The present invention relates to a compressor and particularly to a structure for a discharge valve mechanism which is mounted at a discharge opening of a compression mechanism.

BACKGROUND ART

Compressors, such as rotary compressors, are well known devices used typically for compressing refrigerant in a refrigerating apparatus having a vapor compression refrigerating cycle refrigerant circuit. A conventional rotary compressor comprises a closed-type casing in which there are mounted a compression mechanism and an electric motor operable to activate the compression mechanism.

The compression mechanism includes a cylinder and a piston which rotates or revolves in an eccentric motion while substantially making contact with an inner peripheral surface of the cylinder. Defined between the cylinder and the piston is a compression chamber. A blade, mounted in the compression chamber, divides the compression chamber into two parts, i.e., a low pressure side (suction side) part and a high pressure side (compression/discharge side) part. One of the low and high pressure side parts of the compression chamber is switched to serve as the other in alternating manner every time the piston makes a single revolution.

When the compressor electric motor is powered, a low pressure gas refrigerant is sucked towards the low pressure side part of the compression chamber from an evaporator of the refrigerant circuit. At the same time, in the high pressure side part of the compression chamber a gas refrigerant is compressed to a high pressure level, and is discharged into the casing. The gas refrigerant present in the inside of the casing flows outwardly from a discharge pipe of the compressor, and is delivered to a condenser of the refrigerant circuit. While being switched in alternation, the high and low pressure side parts of the compression chamber repeatedly carry out the aforesaid operations, and the compression mechanism substantially continuously sucks in a low pressure gas refrigerant and, at the same time, discharges a high pressure gas refrigerant.

The compression mechanism is provided with a discharge opening through which high pressure gas refrigerant is discharged into the casing from the compression chamber. A discharge valve mechanism is mounted at the discharge opening. Generally the discharge valve mechanism includes a reed valve as a valve element. When the pressure in the high pressure side part of the compression chamber exceeds the pressure in the casing by more than a predetermined value, the resulting pressure difference between the high pressure side part and the casing causes the reed valve to carry out an operation of placing the discharge opening in the open state. On the other hand, when gas refrigerant flows outwardly from the compression chamber and enters the casing, the high pressure side part is switched to serve as the low pressure side part. As a result, the aforesaid pressure difference diminishes, thereby causing the reed valve to carry out an operation of placing the discharge opening in the closed state.

However, there is an overcompression loss problem with the above-mentioned discharge valve mechanism. More specifically, when the lift amount of a reed valve is small or when the opening area of a discharge opening is small, the resistance against the passage of a high pressure gas refrigerant increases. This results in compressing a refrigerant to excess in the compression chamber. On the contrary, if the lift amount of the reed valve is increased, this causes lags in closing the valve element. As a result, a high pressure gas refrigerant flows backwards from the casing into the compression chamber. Accordingly, there is the possibility that a volumetric efficiency drop occurs. On the other hand, if the opening area of the discharge opening is increased, the reed valve, too, increases in size and its mass increases. This may result in a valve opening response drop causing an overcompression loss.

If the opening area of the discharge opening is increased to a further extent, the refrigerant that has once been compressed expands again. This produces a new problem that the efficiency of the compressor falls off (re-expansion loss). More specifically, during the refrigerant discharge operation, there exists a certain amount of high pressure refrigerant remaining in the volume of the discharge opening. If the opening area of the discharge opening is increased, this results in increasing the amount of high pressure refrigerant remaining within the discharge opening. Accordingly, the amount of refrigerant which expands in the compression chamber after discharge becomes greater and, as a result, there occurs a drop in compression efficiency.

Consequently, in order to deal with such problems, a discharge valve mechanism which makes use of a poppet valve shaped like a circular cone has been proposed (see for example Japanese Patent Application Kokai Publication No. 2001-289254). A part of a valve element is fitted into a discharge opening. In the discharge valve mechanism disclosed in this patent publication, the poppet valve is employed for the purpose of gaining a discharge opening area. In addition, the poppet valve is used with a view to inhibiting the occurrence of overcompression or re-compression losses by reducing the amount of gas refrigerant remaining in the discharge opening after discharge.

Problems to be Solved

However, even the use of a poppet valve may produce some problems. That is to say, if the operating displacement is made variable by making an electric motor variable in speed by inverter control, the rate of flow of gas refrigerant at the discharge opening increases or decreases. This presents overcompression loss problems.

More specifically, a valve element originally designed for use at small flow rate is, as a rule, small in lift amount as well as in opening area. If such a valve element is used at a large flow rate, the velocity of flow increases because of lift amount insufficiency and opening area insufficiency. This results in an increase in discharge resistance, thereby producing overcompression losses. On the other hand, if a valve element originally designed for use at large flow rate is used at a small flow rate, the valve element is of a size larger than is required for such a small flow rate. In addition, the flow velocity becomes slower and, as a result, the level of pressure acting on the valve element falls off. Consequently, the response during the opening operation deteriorates. After all, an overcompression loss occurs.

Bearing in mind the above-mentioned problems with the prior art techniques, the present invention was made. Accordingly, a general object of the present invention is to inhibit the occurrence of overcompression losses in operations from small to large displacement in a variable displacement compressor and to achieve improvements in compressor operating efficiency.

SUMMARY OF THE INVENTION

In accordance with the present invention, the number of discharge openings (29a, 29b) of a discharge valve mechanism (40) is pluralized. And the number of discharge openings (29a, 29b) to be placed in the open state is varied depending on the pressure and the rate of flow of discharge gas during operation.

More specifically, the present invention is directed to a variable displacement compressor which comprises a compression mechanism (20) and a drive mechanism (30) operable to activate the compression mechanism (20) and in which the compression mechanism (20) includes a discharge valve mechanism (40).

And a first aspect of the present invention is characterized in that: (i) the discharge valve mechanism (40) is configured such that discharge openings (29a, 29b) are placed in an open or closed state by means of a plate-like valve element (41) which is a reed valve, and each of the discharge openings (29a, 29b) is formed at a respective location between a base end side and a leading end side of the valve element (41), and (ii) a corresponding portion of the valve element (41) to the discharge opening (29a) on the leading end side has a bending strength set smaller than that of a corresponding portion of the valve element (41) to the discharge opening (29b) on the base end side.

In the arrangement of the first aspect of the present invention in which the discharge openings (29a, 29b) are placed in the open or closed state by means of the plate-like valve element (41) which is a reed valve, the discharge openings (29a, 29b) are scatteredly formed between the base end side and the leading end side of the valve element (41), thereby making it possible to make the opening area of the discharge openings (29a, 29b) relatively large while maintaining the width of the valve element (41) at the same level as conventional. Stated another way, with this construction, there is no need to increases the size of the valve element (41) itself. Accordingly, since the opening area of the discharge openings (29a, 29b) is large, this makes it possible to prevent an excessive increase in discharge resistance, even during the large-displacement operation of the compression mechanism (20). Besides, since the valve element (41) is small in size and superior in opening/closing response, this makes it possible to prevent the occurrence of overcompression.

In addition, in the first aspect of the present invention, it is arranged such that the portions of the valve element (41) corresponding to the discharge openings (29a, 29b) differ from each other in bending strength. As a result of such arrangement, the opening area becomes larger when the pressure acting on the valve element (41) is great than when the pressure acting on the valve element (41) is small. Accordingly, when the operating displacement becomes greater thereby resulting in an increased flow rate, the difference in pressure between the inside and the outside of the compression chamber increases. Therefore the opening area becomes relatively large, thereby inhibiting discharge resistance. In addition, since the opening area can be made small during the small-displacement operation, this makes it possible to prevent the flow velocity from becoming excessively slow and to avoid a drop in response.

A second aspect of the present invention according to the compressor of the first invention is characterized in that: (i) two discharge openings (29a, 29b) are formed in the compression mechanism (20), and (ii) the valve element (41) includes a small-width part (41a) of smaller width dimension between the corresponding portion to the discharge opening (29b) on the base end side and the corresponding portion to the discharge opening (29a) on the leading end side.

A third aspect of the present invention according to the compressor of the first aspect of the present invention is characterized in that: (i) two discharge openings (29a, 29b) are formed in the compression mechanism (20), and (ii) the corresponding portion of the valve element (41) to the discharge opening (29a) on the leading end side has a smaller width dimension than that of the corresponding portion of the valve element (41) to the discharge opening (29b) on the base end side.

In each of the second and third sapects, the leading end side portion of the valve element (41) is rendered more liable to bending than the base end side portion of the valve element (41). As a result of such arrangement, during the small-displacement operation, the discharge opening (29a) situated on the leading end side is allowed to easily enter the open state, thereby providing a relatively small opening area. In such a relatively small opening-area state, refrigerant is discharged . On the other hand, during the large-displacement operation, both of the discharge openings (29a, 29b) are placed in the open state, thereby securing a relatively large opening area. In such a relatively large opening-area state, refrigerant is discharged. Accordingly, there occurs no drop in response during the small-displacement operation. There is no increase in discharge resistance because the flow velocity does not become excessively high during the large-displacement operation.

In addition, a fourth aspect of the present invention is characterized in that the discharge valve mechanism (40) comprises a first valve mechanism (40A) including a first valve element (41A) which is a reed valve operable to place a discharge opening (29a) in an open or closed state, and a second valve mechanism (40B) including a second valve element (41B) which is a poppet valve operable to place another discharge opening (29b) in an open or closed state. Here, the reed valve is a plate-like valve element so configured as to come in contact with an opening end surface of the discharge opening (29a). The poppet valve is a valve element provided with a projected part so configured as to come in contact with an opening inner peripheral surface of the discharge opening (29b).

In the fourth aspect of the present invention, it is arranged such that the discharge openings (29a, 29b) of the compression mechanism (20) are placed in the open or closed state by means of the first valve element (41A) (reed valve) and by means of the second valve element (41B) (poppet valve), respectively. As a result of such arrangement, it becomes possible to maintain high response properties of the reed valve. In addition, by virtue of the poppet valve, it is possible to achieve an increased discharge flow rate by gaining an opening area without any increase in the amount of refrigerant remaining in the discharge opening. Accordingly, during the small-displacement operation, the occurrence of overcompression is prevented by the opening of the first valve element (41A) of high response. On the other hand, during the large-displacement operation, the second valve element (41B), too, is placed in the open state to provide a sufficient opening area, and the flow velocity of refrigerant is held low, thereby making it possible to achieve a reduction in discharge resistance.

In addition, during the large-displacement operation, with the rise in pressure during the time that the piston makes a single revolution, the reed valve opens first and then the poppet valve enters its fully open state. Because of this, the occurrence of overcompression in the early stage of discharge is prevented by the reed valve of high response and the occurrence of overcompression in the discharge later stage is prevented by the poppet valve capable of providing a sufficient opening area.

Furthermore, a fifth invention according to the compressor of the fourth invention is characterized in that: (i) the first valve mechanism (40A) has a discharge port diameter (φDd1) and a seat diameter (φDs1) and the second valve mechanism (40B) has a discharge port diameter (φDd2) and a seat diameter (φDs2), wherein the discharge port diameters are set such that φDd1<φDd2, while the seat diameters are set such that φDs1<φDs2, and (ii) the first valve element (41A) has a lift amount (L1) and the second valve element (41B) has a lift amount (L2), wherein the lift amounts are set such that L2<L1. Here, the discharge port diameters (φDd1, φDd2) are opening diameters of the discharge openings (29a, 29b) on the compression chamber side, and the seat diameters (φDd1, φDs2) are opening diameters of the discharge openings (29a, 29b) on the contact side of the valve elements (41A, 41B) with the discharge openings (29a, 29b).

In the fifth invention, the discharge port diameter (φDd1) and seat diameter (φDs1) of the first valve mechanism (40A) are set smaller than the discharge port diameter (φDd2) and seat diameter (φDs2) of the second valve mechanism (40B). Such a setting makes it possible to reduce the size of the first valve element (41A) as the reed valve, and the opening/closing response of the first valve element (41A) during the small-displacement operation is improved to a satisfactory level. In addition, since the lift amount (L2) of the second valve element (41B) is smaller than the lift amount (L1) of the first valve element (41A), this makes not only a lag in the closing of the second valve element (poppet valve) (41B) which is placed in the open or closed state during the large-displacement operation but also a backflow of refrigerant into the compression chamber (25) due to such a lag more unlikely to happen.

In addition, a sixth invention is characterized in that: (i) the discharge valve mechanism (40) is configured such that a plurality of discharge openings (29a, 29b) are placed in an open or closed state by means of a plate-like valve element (43), and each of the discharge openings (29a, 29b) is formed at a respective location between a base end side and a leading end side of the valve element (43), and (ii) a corresponding portion (43a) of the valve element (43) to the discharge opening (29a) on the leading end side has a smaller bending strength than that of a corresponding portion (43b) of the valve element (43) to the discharge opening (29b) on the base end side, and the corresponding portion (43a) to the discharge opening (29a) on the leading end side is formed as a reed valve while the corresponding portion (43b) to the discharge opening (29b) on the base end side is formed as a poppet valve.

A seventh invention according to the compressor of the sixth invention is characterized in that: (i) two discharge openings (29a, 29b) are formed in the compression mechanism (20), and (ii) the valve element (43) includes a small-width part (43c) of smaller width dimension between a corresponding portion of the valve element (43) to the discharge opening (29b) on the base end side and a corresponding portion of the valve element (43) to the discharge opening (29a) on the leading end side .

An eighth invention according to the compressor of the sixth invention is characterized in that: (i) two discharge openings (29a, 29b) are formed in the compression mechanism (20), and (ii) a corresponding portion of the valve element (43) to the discharge opening (29a) on the leading end side has a smaller width dimension than that of a corresponding portion of the valve element (43) to the discharge opening (29b) on the base end side.

In each of the sixth to eighth inventions, the valve element (43) in the form of a single plate has the function of the reed valve (43a) as well as the function of the poppet valve (43b), and it is designed such that the reed valve (43a) opens before the poppet valve (43b) does so. This accordingly ensures that the reed valve (43a) of high response is placed in the open state during the small-displacement operation. On the other hand, during the large-displacement operation, both of the reed valve (43a) and the poppet valve (43b) are placed in the open state, thereby providing a sufficient opening area. In addition, the reed valve (43a) is first placed in the open state without fail even during the large-displacement operation, thereby preventing the flow velocity of refrigerant from excessively increasing in the opening early stage.

Furthermore, a fifth aspect of the present invention according to the compressor of the fourth aspect of the present invention is characterized in that: (i) the first valve mechanism (40A) has a discharge port diameter (φDd1) and a seat diameter (φDd1) and the second valve mechanism (40B) has a discharge port diameter (φDd2) and a seat diameter (φDs2), wherein the discharge port diameters are set such that φDd1<φDd2, while the seat diameters are set such that φDs1<φDs2, and (ii) the first valve element (41A) has a lift amount (L1) and the second valve element (41B) has a lift amount (L2), wherein the lift amounts are set such that L2<L1. Here, the discharge port diameters (φDd1, φDd2) are opening diameters of the discharge openings (29a, 29b) on the compression chamber side, and the seat diameters (φDs1, φDs2) are opening diameters of the discharge openings (29a, 29b) on the contact side of the valve elements (41A, 41B) with the discharge openings (29a, 29b).

In the fifth aspect of the present invention, the discharge port diameter (φDd1) and seat diameter (φDd1) of the first valve mechanism (40A) are set smaller than the discharge port diameter (φDd2) and seat diameter (φDs2) of the second valve mechanism (40B). Such a setting makes it possible to reduce the size of the first valve element (41A) as the reed valve, and the opening/closing response of the first valve element (41A) during the small-displacement operation is improved to a satisfactory level. In addition, since the lift amount (L2) of the second valve element (41B) is smaller than the lift amount (L1) of the first valve element (41A), this makes not only a lag in the closing of the second valve element (poppet valve) (41B) which is placed in the open or closed state during the large-displacement operation but also a backflow of refrigerant into the compression chamber (25) due to such a lag more unlikely to happen.

In addition, a sixth aspect of the present invention is characterized in that: (i) the discharge valve mechanism (40) is configured such that a plurality of discharge openings (29a, 29b) are placed in an open or closed state by means of a plate-like valve element (43), and each of the discharge openings (29a, 29b) is formed at a respective location between a base end side and a leading end side of the valve element (43), and (ii) a corresponding portion (43a) of the valve element (43) to the discharge opening (29a) on the leading end side has a smaller bending strength than that of a corresponding portion (43b) of the valve element (43) to the discharge opening (29b) on the base end side, and the corresponding portion (43a) to the discharge opening (29a) on the leading end side is formed as a reed valve while the corresponding portion (43b) to the discharge opening (29b) on the base end side is formed as a poppet valve.

A seventh aspect of the present invention according to the compressor of the sixth aspect of the present invention is characterized in that: (i) two discharge openings (29a, 29b) are formed in the compression mechanism (20), and (ii) the valve element (43) includes a small-width part (43c) of smaller width dimension between a corresponding portion of the valve element (43) to the discharge opening (29b) on the base end side and a corresponding portion of the valve element (43) to the discharge opening (29a,) on the leading end side.

An eighth aspect of the present invention according to the compressor of the sixth aspect of the present invention is characterized in that: (i) two discharge openings (29a, 29b) are formed in the compression mechanism (20), and (ii) a corresponding portion of the valve element (43) to the discharge opening (29a) on the leading end side has a smaller width dimension than that of a corresponding portion of the valve element (43) to the discharge opening (29b) on the base end side.

In each of the sixth to eighth aspects, the valve element (43) in the form of a single plate has the function of the reed valve (43a) as well as the function of the poppet valve (43b), and it is designed such that the reed valve (43a) opens before the poppet valve (43b) does so. This accordingly ensures that the reed valve (43a) of high response is placed in the open state during the small-displacement operation. On the other hand, during the large-displacement operation, both of the reed valve (43a) and the poppet valve (43b) are placed in the open state, thereby providing a sufficient opening area. In addition, the reed valve (43a) is first placed in the open state without fail even during the large-displacement operation, thereby preventing the flow velocity of refrigerant from excessively increasing in the opening early stage.

In addition, a ninth aspect of the present invention is characterized in that: (i) the discharge valve mechanism (40) comprises a first valve mechanism (40A) including a first valve element (41A) operable to place a discharge opening (29a) in an open or closed state, and a second valve mechanism (40B) including a second valve element (41B) operable to place another discharge opening (29b) in an open or closed state, and (ii) both the first valve element (41A) and the second valve element (41B) are formed by reed valves and the first valve element (41A) has a bending strength set smaller than that of the second valve element (41B).

Finally, a tenth aspect of the present invention according to the cornpressor of the ninth aspect of the present invention is characterized in that the first valve element (41A) has a smaller thickness than that of the second valve element (41B).

In each of the ninth and tenth aspects, the discharge valve mechanism (40) includes the two reed valves (41A, 41B), and it is arranged such that one of the reed valves (41A, 41B) is placed in the open state before the other by the difference in bending strength therebetween. This ensures that the first reed valve (41A) of high response is placed in the open state during the small-displacement operation. On the other hand, during the large-displacement operation, both of the two reed valves (41A, 41B) are placed in the open state, thereby securing a sufficient opening area.

In accordance with the arrangement of the first aspect of the present invention, the plural discharge openings (29a, 29b) are placed in the open state by means of the single valve element (41) which is a reed valve and, in addition, the number of discharge openings (29a, 29b) to be placed in the open state is varied depending on the flow rate and the pressure of discharge refrigerant. Accordingly, there is made an increase in opening area during the large-displacement operation of the compressor (1), thereby inhibiting the resistance to discharge of the refrigerant. Besides, the rise in flow velocity and the occurrence of overcompression losses resulting from such a rise are also inhibited. In addition, during the small-displacement operation of the compressor (1), the opening area is reduced, thereby preventing an excessive slowdown in flow velocity. Furthermore, the valve element (41) has a portion which has a smaller bending strength, so that the drop in response and the occurrence of overcompression losses due to such a response drop are inhibited. As just described, in accordance with the first aspect of the present invention, the occurrence of overcompression losses is prevented all over the operation range even when there are made variations in operating displacement, thereby making it possible to improve the operating efficiency to a higher level than conventional.

In addition, in accordance with the second and third aspects, a part of the valve element (41) is made small in width dimension in order that the opening/closing response of the valve element (41) will not fall off even during the small-displacement operation. This provides a simplified structure and therefore prevents the rise in cost.

In accordance with the fourth aspect of the present invention, the occurrence of overcompression losses during the small-displacement operation is inhibited by virtue of the high response of the reed valve (41A), and the occurrence of overcompression losses during the large-displacement operation is inhibited by virtue of the sufficient opening area of the poppet valve (41B). Accordingly, it is possible to achieve improvements in compressor operating efficiency regardless of the operating displacement. In addition, especially during the large-displacement operation, the occurrence of overcompression in the discharge early stage is prevented by the reed valve (41A) and the occurrence of overcompression in the discharge later stage is prevented by the poppet valve (41B), during the time that the rotary piston (24) makes a single revolution. In addition, in accordance with the fifth aspect of the present invention, the relationship between the discharge port diameter ($\phi$Dd1) of the reed valve (41A) and the discharge port diameter ($\phi$Dd2) of the poppet valve (41B), the relationship between the seat diameter ($\phi$Ds1) of the reed valve (41A) and the seat diameter ($\phi$Ds2) of the poppet valve (41B), and the relationship between the lift amount (L1) of the reed valve (41A) and the seat diameter (L2) of the poppet valve (41B) are specified. This enhances the effects of the fourth aspect of the present invention and ensures that the operating efficiency of the compressor is improved.

In accordance with the sixth aspect of the present invention, the single valve element (43) has the function of the reed valve (43a) as well as the function of the poppet valve (43b) and, in addition, it is arranged such that the reed valve (43a) is placed in the open state before the poppet valve (43b) is placed in the open state. Accordingly, like the fourth aspect of the present invention, the occurrence of overcompression losses during the small-displacement operation is inhibited by virtue of the high response of the reed valve (43a), and the occurrence of overcompression losses during the large-displacement operation is inhibited by virtue of the sufficient opening area on the side of the poppet valve (43b). Accordingly, it is possible to achieve improvements in compressor operating efficiency regardless of the operating displacement.

In addition, in accordance with each of the seventh and eighth aspects, a part of the valve element (43) is made small in width dimension in order that the opening/closing response of the valve element (43) will not fall off even during the small-displacement operation. This provides a simplified structure and therefore prevents the rise in cost.

In accordance with the ninth aspect of the present invention, the two reed valves (41A, 41B) having different bending strengths are employed and, in addition, it is arranged such that the opening area of each of the discharge openings (29a, 29b) varies gradually depending on the pressure and the flow rate of refrigerant. As a result, it becomes possible to satisfy requirements such as a high response speed during the small-displacement operation and a sufficient opening area during the large-displacement operation. Accordingly, as in the each of the foregoing aspects, the ninth aspect of the present invention achieves efficient operations over the operation range from small to large displacement with a less overcompression loss.

Finally, in accordance with the tenth aspect of the present invention, it is possible to realize the operation/working-effect of the ninth aspect of the present invention by just making the two reed valves (41A, 41B) different in thickness from each other. This makes it possible to simplify the structure of the discharge valve mechanism (40), thereby preventing the rise in costs.

DETAILED DESCRIPTION OF THE PREFERRED EMBODIMENTS

First Embodiment of the Invention

Hereinbelow, a first embodiment of the present invention will be described in detail with reference to the drawings.

Figure 1:
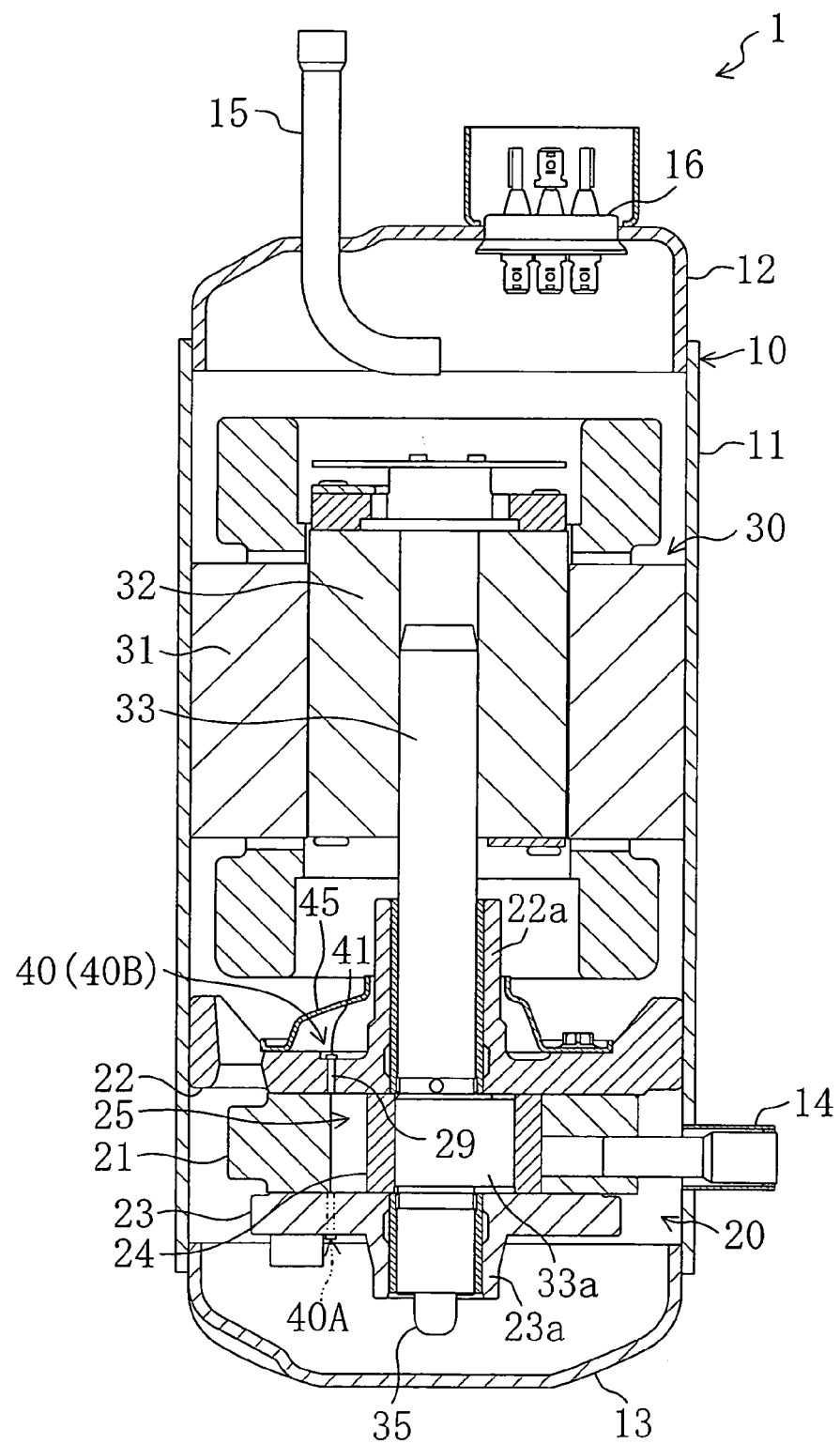
FIG. 1 is a cross section view showing an arrangement of a compressor in accordance with a first embodiment of the present invention.

The first embodiment relates to a compressor (1) of a rotary piston type. Referring to FIG. 1, the compressor (1) comprises a casing (10) in which there are disposed a compression mechanism (20) and an electric motor (drive mechanism) (30) for activating the compression mechanism (20). The compressor (1) is of a fully closed type. When the compression mechanism (20) is powered by the electric motor (30), the compressor (1) sucks in a refrigerant and compresses it. The refrigerant compressed is discharged out of the compressor (1), and circulates in a refrigerant circuit.

The casing (10) comprises a cylindrical main body part (11) constituting a peripheral wall of the casing (10), and end plates (12, 13) fixedly secured to upper and lower ends of the main body part (11), respectively. In addition, both of the compression mechanism (20) and the electric motor (30) are fixedly secured to the main body part (11) of the casing (10), and in the casing (10) the compression mechanism (20) underlies the electric motor (30).

The casing (10) is provided, at a portion of the main body part (11) situated near the bottom, with a suction pipe (14). On the other hand, the upper end plate (12) is provided with a discharge pipe (15) which is a communicating pipe extending from the inside to the outside of the casing (10). Furthermore, the upper end plate (12) is provided with a terminal (16) for supplying electric power to the electric motor (30).

The compression mechanism (20), comprised of a cylinder (21), a front head (22), a rear head (23), and a rotary piston (24), is disposed at the bottom of the casing (10). The cylinder (21), the front head (22), and the rear head (23) are fastened together by a fastening means such as bolt and are assembled into a single structure. The front head (22) is fixedly secured to the top of the cylinder (21) and the rear head (23) is fixedly secured to the bottom of the cylinder (21). By joining the front head (22) to the main body part (11) by means of spot welding, the compression mechanism (20) is fixedly secured to the casing (10).

The cylinder (21) is formed into a thick cylindrical shape. And, a compression chamber (25) in which the rotary piston (24) rotates is comparted between an inner peripheral surface of the cylinder (21), a lower end surface of the front head (22), and an upper end surface of the rear head (23).

The revolution speed of the electric motor (30) can be inverter-controlled. And, the compressor (1) is made variable in its operating displacement by adjusting the revolution speed of the electric motor (30).

The electric motor (30) comprises a stator (31) and a rotor (32). The stator (31) is fixedly secured to the casing (10) at a location above the compression mechanism (20). More specifically, the stator (31) is fixed, by means of shrinkage fitting, to the main body part (11) serving as the peripheral wall of the casing (10). A coil of the stator (31) is electrically connected to a terminal pin of the terminal (16) through a lead wire (not shown). In addition, a drive shaft (33) is coupled to the rotor (32). The drive shaft (33) extends through the center of the casing (10) and passes vertically through the compression chamber (25). In order to support the drive shaft (33), bearing parts (22a, 23a) are formed in the front and rear heads (22) and (23) of the compression mechanism (20), respectively.

Figure 2:
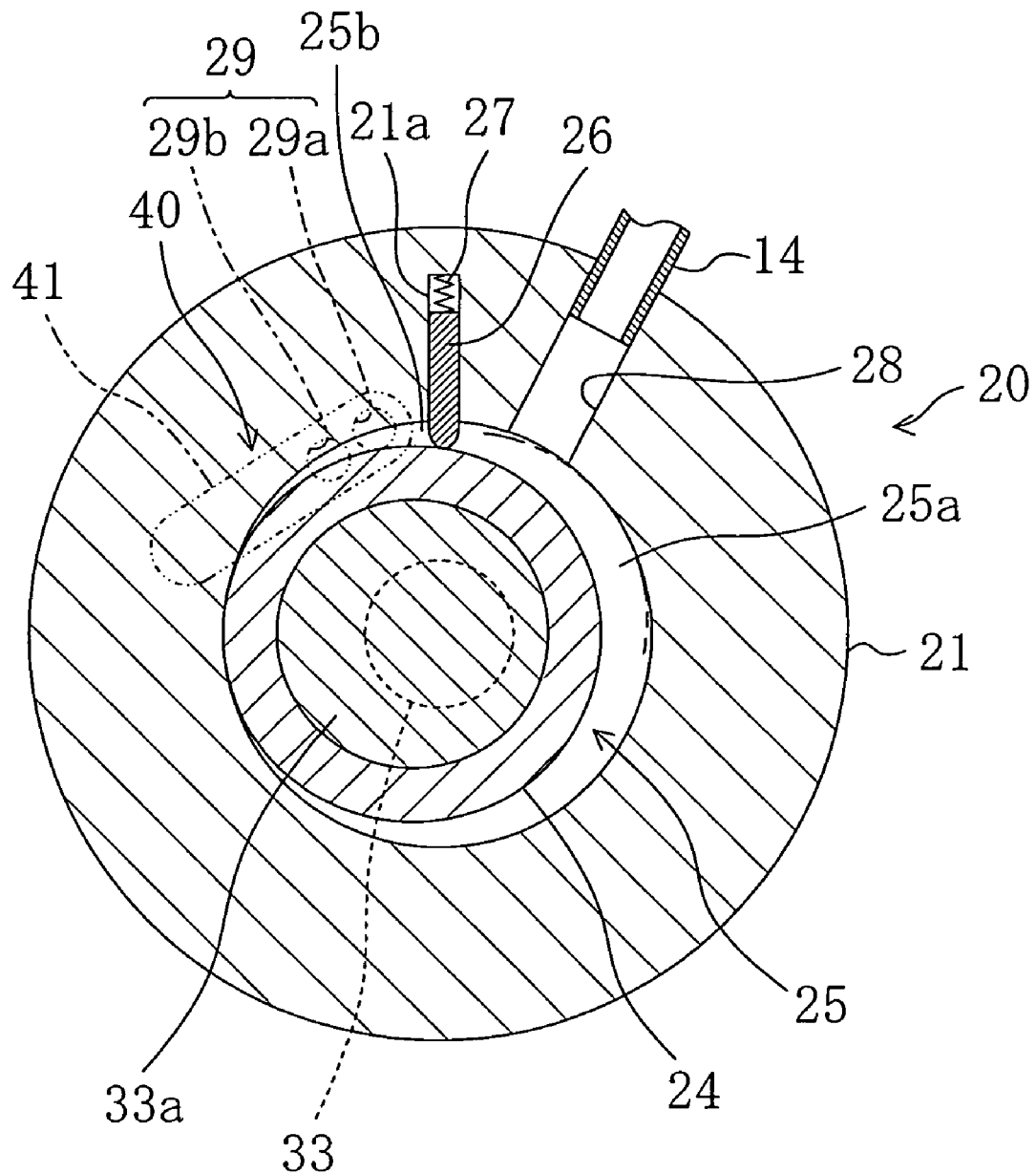
FIG. 2 is a transverse cross section view of a compression mechanism.

The drive shaft (33) includes an eccentric part (33a) which is located in the inside of the compression chamber (25). The eccentric part (33a) has a greater diameter than its overlying and underlying portions of the drive shaft (33). The eccentric part (33a) is off-centered by a predetermined amount from the rotational center of the drive shaft (33). And, the rotary piston (24) of the compression mechanism (20) is mounted on the eccentric part (33a). Referring to FIG. 2 which is a transverse cross section view of the compression mechanism (20), the rotary piston (24) is shaped like a circular ring, and is formed so that its outer peripheral surface comes into contact with an inner peripheral surface of the cylinder (21) at a substantially single point.

A blade groove (21a) is formed in the cylinder (21), extending along a radial direction of the cylinder (21). A blade (26) is shaped like an oblong plate, and is mounted so as to be slidable in the blade groove (21a) in the radial direction of the cylinder (21). The blade (26) is biased inwardly in the radial direction by a spring (27) and moves forward and backward in blade groove (21a) as the drive shaft (33) rotates, with its leading end in constant pressure contact with the outer peripheral surface of the rotary piston (24).

The blade (26) divides the compression chamber (25), defined between the inner peripheral surface of the cylinder (21) and the outer peripheral surface of the rotary piston (24), into a suction-side low pressure chamber (25a) and a compression/discharge-side high pressure chamber (25b). Formed in the cylinder (21) are a suction opening (28) and a discharge opening (29). The suction opening (28) extends penetratingly through the cylinder (21) from the outer peripheral surface to the inner peripheral surface thereof so that the suction pipe (14) and the low pressure chamber (25a) communicate with each other. On the other hand, the discharge opening (29) extends axially penetratingly through the front head (22) so that the high pressure chamber (25b) and a space in the inside of the casing (10) communicate with each other.

A suction line extending from an accumulator (not shown) is connected, through the suction pipe (14), to the suction opening (28). On the other hand, the front head (22) is provided with a discharge valve mechanism (40). The discharge valve mechanism (40) is a mechanism formed by mounting on the front head (22) a valve element (41) operable to place the discharge opening (29) in the open or closed state.

Figure 3:
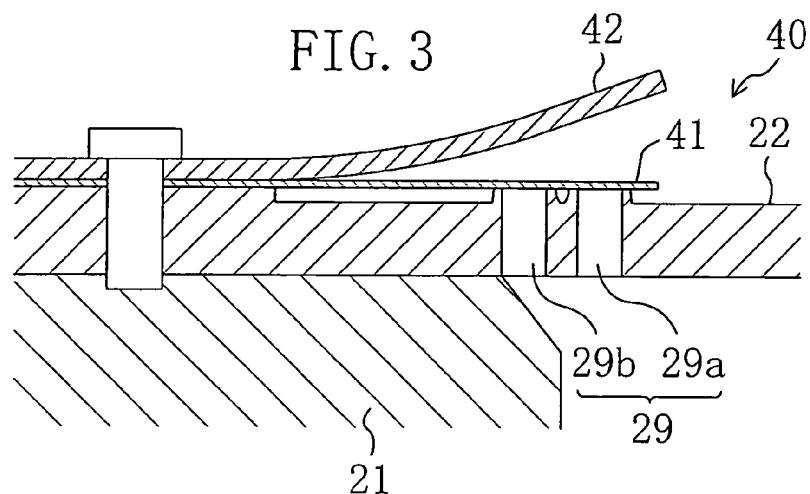
FIG. 3 is an enlarged cross section view of a discharge valve mechanism.

In the discharge valve mechanism (40), two discharge openings, e.g., a first discharge opening (29a) and a second discharge opening (29b), are formed side by side, as depicted in FIG. 3 which is an enlarged cross section view. The valve element (41) is formed by a reed valve. One end side of the valve element (41) is fixedly secured to the front head (22) and the other end side of the valve element (41) is so formed as to place the two discharge openings (29a, 29b) in the open or closed state. The operation of the valve element (41) is as follows. When the compression chamber (25) (the high pressure chamber (25b)) is compressed to a predetermined high pressure level and, as a result, the difference between the pressure in the compression chamber (25) and the pressure in the casing (10) reaches a predetermined value, the valve element (41) operates to place the discharge openings (29a, 29b) in the open state. On the other hand, when a high pressure gas refrigerant is discharged out of the compression chamber (25), the pressure in the compression chamber (25) falls off after the discharge to result in a decrease in the aforesaid pressure difference, and the valve element (41) operates to place the discharge openings (29a, 29b) in the closed state.

In addition, the front head (22) is provided with a valve presser (stopper) (42) for restricting the amount of bending (the amount of lift) of the valve element (41). The valve element (41) is prevented by the valve presser (42) from bending excessively. A muffler (45) is attached to the front head (22) as a cover over an upper surface of the front head (22) (see FIG. 2).

As shown in FIG. 4(a), the valve element (41) has a small-width part (41a) having a smaller width dimension which is formed between a corresponding portion of the valve element (41) to the first discharge opening (29a) which is situated at the leading end of the valve element (41) and a corresponding portion of the valve element (41) to the second discharge opening (29b) which is located nearer to the base end side than the leading end portion. As a result of forming the valve element (41) into such a shape, the leading end portion of the valve element (41) corresponding to the first discharge opening (29a) is rendered liable to bending because the portions of the valve element (41) corresponding to the discharge openings (29a, 29b) differ from each other in bending strength and in rigidity. Accordingly, when there is a change in the pressure acting on the valve element (41), the number of discharge openings (29a, 29b) to be placed in the open state is likewise changed to one or to two.

On the other hand, the drive shaft (33) is provided with an oil supply pump (35) and an oil supply passageway (not shown). The oil supply pump (35), disposed at a lower end part location of the drive shaft (33), is so constructed as to draw refrigerating machine oil stored at the bottom of the casing (10) as the drive shaft (33) rotates. The oil supply passageway extends vertically within the drive shaft (33) and communicates with oil supply openings (not shown) formed in sliding portions of the compression mechanism (20) so that the refrigerating machine oil drawn by the oil supply pump (35) is supplied to each sliding portion. More specifically, both the oil supply passageway and the oil supply openings are constructed so that refrigerating machine oil is supplied to areas where the inner peripheral surface of the cylinder (21) and the outer peripheral surface of the piston (24) slide against each other and to bearing surfaces of the bearing parts (22a, 23a) of the front and rear heads (22, 23).

Running Operation

Next, the running operation of the compressor (1) in accordance with the present embodiment will be described.

When an electric current controlled to a predetermined frequency by an inverter flows through the electric motor (30), this causes the rotor (32) to start rotating. Rotational motion of the rotor (32) is transmitted, through the drive shaft (33), to the rotary piston (24) of the compression mechanism (20). Consequently, the compression mechanism (20) performs compression operations as prescribed.

The compression operation of the compression mechanism (20) will be described specifically by making reference to FIG. 2. In the first place, the state of a virtual line of the substantial contact of the inner peripheral surface of the cylinder (21) with the outer peripheral surface of the rotary piston (24) immediately on the right side of an opening part of the suction opening (28) in the inner peripheral surface of the cylinder (21) will be described. In this state, the volume of the low pressure chamber (25a) of the compression chamber (25) is the smallest. When the rotary piston (24) moves circularly to the right as viewed from above the figure, in other words when the rotary piston (24) rotates clockwise, the volume of the low pressure chamber (25a) increases as the rotary piston (24) rotates. As a result, low pressure gas refrigerant is drawn into the low pressure chamber (25a). At that time, although the rotary piston (24) moves eccentrically within the compression chamber (25), no gas refrigerant flows into the low pressure chamber (25a) from the high pressure chamber (25b) because the blade (26) is always pressed against the rotary piston (24). The drawing of gas refrigerant into the low pressure chamber (25a) continues until the time that the cylinder (21) and the rotary piston (24) come into contact with each other immediately on the right side of the opening part of the suction opening (28) when the rotary piston (24) makes a single revolution.

The part which has completed the sucking-in of gas refrigerant in the above-described manner now becomes the high pressure chamber (25*b*) in which the gas refrigerant is compressed. And, at this point in time, the volume of the high pressure chamber (25*b*) is the largest. The high pressure chamber (25*b*) is filled with low pressure gas refrigerant. Newly formed next to the high pressure chamber (25*b*) is the low pressure chamber (25*a*) and the sucking-in of refrigerant is repeatedly carried out in the low pressure chamber (25*a*).

At this time, the pressure in the high pressure chamber (25*b*) is still low, so that the discharge opening (29) is closed by the valve element (41), in other words the high pressure chamber (25*b*) is being a closed space. When the rotary piston (24) rotates in such a state, the volume of the high pressure chamber (25*b*) decreases and the gas refrigerant in the high pressure chamber (25*b*) is compressed. And, when the pressure in the high pressure chamber (25*b*) reaches a predetermined value and the difference in pressure between the outside and the inside of the compression chamber (25) becomes a preset value, the valve element (41) is pushed by high pressure gas refrigerant in the high pressure chamber (25*b*) and becomes bent. As a result, the discharge opening (29) is placed in the open state. Accordingly, high pressure gas is discharged into the casing (10) from the high pressure chamber (25*b*).

In the present embodiment, the two discharge openings (29*a*, 29*b*) are provided. Additionally, both of the discharge openings (29*a*, 29*b*) are opened or closed by a single valve element (i.e., the valve element (41)) and the bending strength of the valve element (41) is made smaller at the leading end side than at the base end side. Accordingly, since, during the small-displacement operation, the discharge flow rate is small, it is possible to place only the first discharge opening (29*a*) on the leading end side in the open state in relation to the difference in pressure between the inner surface side and the outer surface side of the valve element (41). At this time, there is no drop in the opening/closing response of the first discharge opening (29*a*) because the leading end side of the valve element (41) is made liable to bending.

On the other hand, the increase in revolution speed of the electric motor (30) increases the operating displacement and, as a result, the discharge flow rate per unit time increases. Consequently, the pressure difference increases and both of the discharge openings (29*a*, 29*b*) are placed in the open state. Accordingly, when the operating displacement is large, the opening area becomes relatively large, thereby suppressing the resistance to the discharge of refrigerant. In addition, during the large-displacement operation, the first discharge opening (29*a*) is placed in the open state very quickly in the early stage of discharge during the time that the rotary piston (24) makes a single revolution, thereby ensuring that the occurrence of overcompression in the discharge early stage is prevented.

The gas refrigerant, discharged from the compression mechanism (20) into the casing (10) by the above-described operations, flows outwardly from the inside of the muffler (45). Thereafter, the gas refrigerant passes through a clearance between the stator (31) and the rotor (32) of the electric motor (30) and then through a void defined between the stator (31) and the casing (10) in a vertical direction from bottom to top. And, the high pressure gas refrigerant which has flowed to above the electric motor (30) is discharged to outside the casing (10) from the discharge pipe (15). Then, the gas refrigerant circulates in the refrigerant circuit (not shown).

Effects of the First Embodiment

In accordance with the arrangement of the first embodiment that the two discharge openings (29*a*, 29*b*) are placed in the open or closed state by the single valve element (reed valve) (41), the discharge openings (29*a*, 29*b*) are provided at two locations between the base end side and the leading end side of the valve element (41). As a result of such an arrangement, it becomes possible to make the opening area of the discharge openings (29*a*, 29*b*) relatively large and to maintain the width of the valve element (41) at the same level as conventional. Because of this, there is no need to increase the width of the valve element (41) in the arrangement of the first embodiment. Since the valve element (41) can remain small in size, there is no drop in opening/closing response of the valve element (41). On the other hand, the provision of the two discharge openings (29*a*, 29*b*) makes it possible to achieve an increase in total opening area. Accordingly, even during the large-displacement operation of the compression mechanism (20), it is possible to inhibit the resistance to discharge from becoming excessively great.

Furthermore, in the present embodiment, the bending strength of the valve element (41) is made partially different and the number of discharge openings (29*a*, 29*b*) which are placed in the open state is made variable depending on the flow rate and on the pressure of refrigerant. As a result of such arrangement, during the large-displacement operation of the compressor (1), the resistance to discharge is held low by an increased opening area. This ensures that the occurrence of an increased flow velocity and the occurrence of an overcompression loss caused by that increase are inhibited. Furthermore, even during the small-displacement operation of the compressor (1), the valve element (41) easily bends at it leading end portion whose bending strength is set smaller, thereby placing the first discharge opening (29*a*) on the leading end side in the open state. Therefore, the occurrence of a drop in response and the occurrence of an overcompression loss caused by that drop are inhibited. And, since it is possible to inhibit the occurrence of overcompression losses even when there are made variations in operating displacement, the operating efficiency is improved more than conventional.

Figure 4:
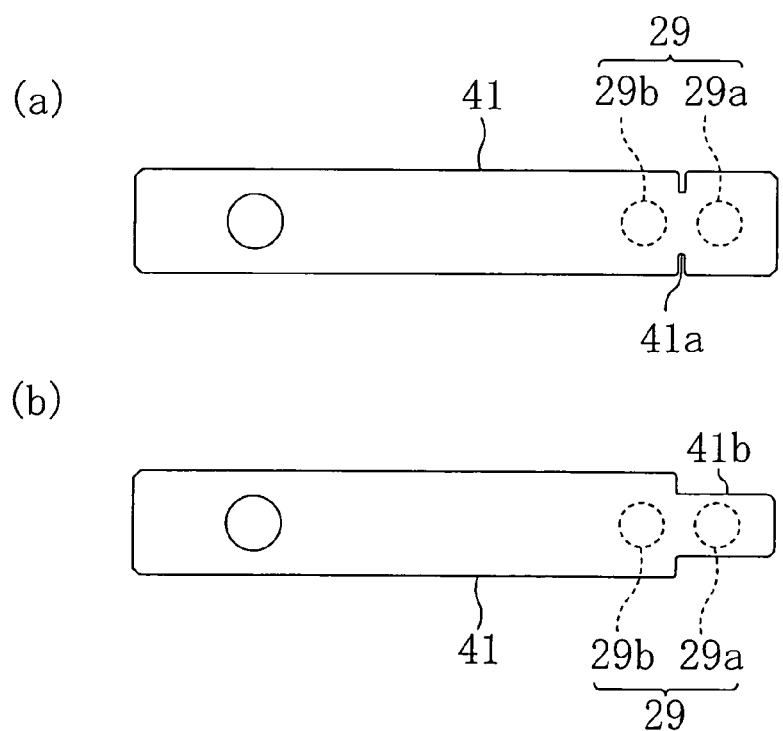
FIGS. 4(a) and (4b) are top plan views of different discharge valves.

Furthermore, as shown in FIG. 4(*a*), it is possible to lessen the bending strength of the leading end portion of the valve element (41) corresponding to the first discharge opening (29*a*) by just narrowing the width of a portion of the valve element (41) corresponding to the area between the first discharge opening (29*a*) and the second discharge opening (29*b*), whereby the discharge valve mechanism (40) is simplified in construction thereby preventing the rise in cost.

Modification Example of the First Embodiment

Referring to FIG. 4(*a*) which illustrates an example of the valve element (41), the small-width part (41*a*) is formed which is situated between a portion of the valve element (41) corresponding to the first discharge opening (29*a*) and a portion of the valve element (41) corresponding to the second discharge opening (29*b*). Alternatively, as shown in FIG. 4(*b*), the valve element (41) may be formed into such a shape that it includes a small-width portion (41*b*) corresponding to the first discharge opening (29*a*). This arrangement also enables the leading end portion (41*b*) of the valve element (41) corresponding to the first discharge opening (29a) to easily bend. As a result, the first discharge opening (29a) is quickly placed in the open state during the small-displacement operation, thereby achieving high-response operations. In addition, both the discharge openings (29a, 29b) are placed in the open state during the large-displacement operation. Accordingly, also in the present modification example, it becomes possible to carry out efficient operations while inhibiting the occurrence of overcompression losses.

Second Embodiment of the Invention

A second embodiment of the present invention is an example which differs from the first embodiment in that the discharge valve mechanism (40) has a different structure.

The discharge valve mechanism (40) of the second embodiment comprises a first valve mechanism (40A) disposed on the rear head's (23) side (as indicated by virtual line of FIG. 1), and a second valve mechanism (40B) disposed on the front head's (22) side.

Figure 5:
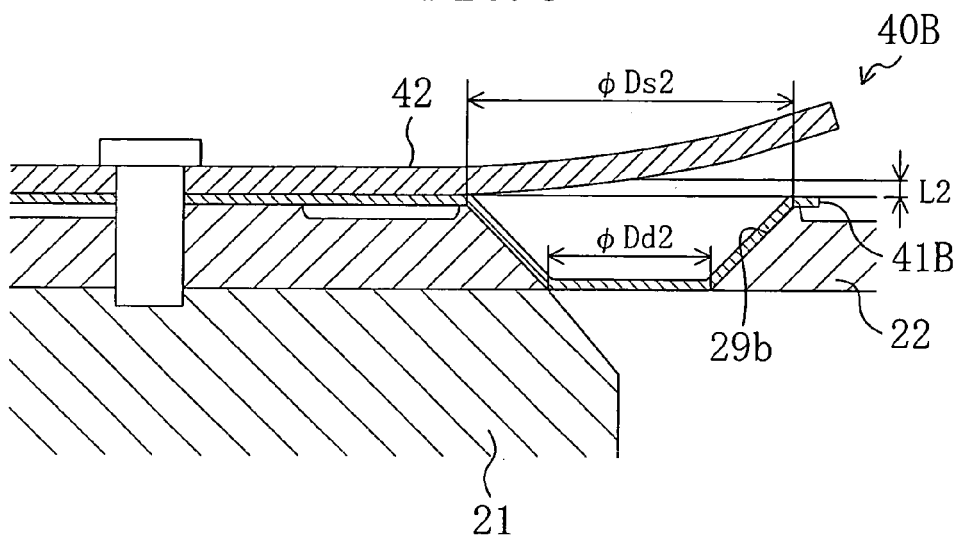
FIG. 5 is an enlarged cross section view showing a second valve mechanism of a discharge valve mechanism in accordance with a second embodiment of the present invention.
Figure 6:
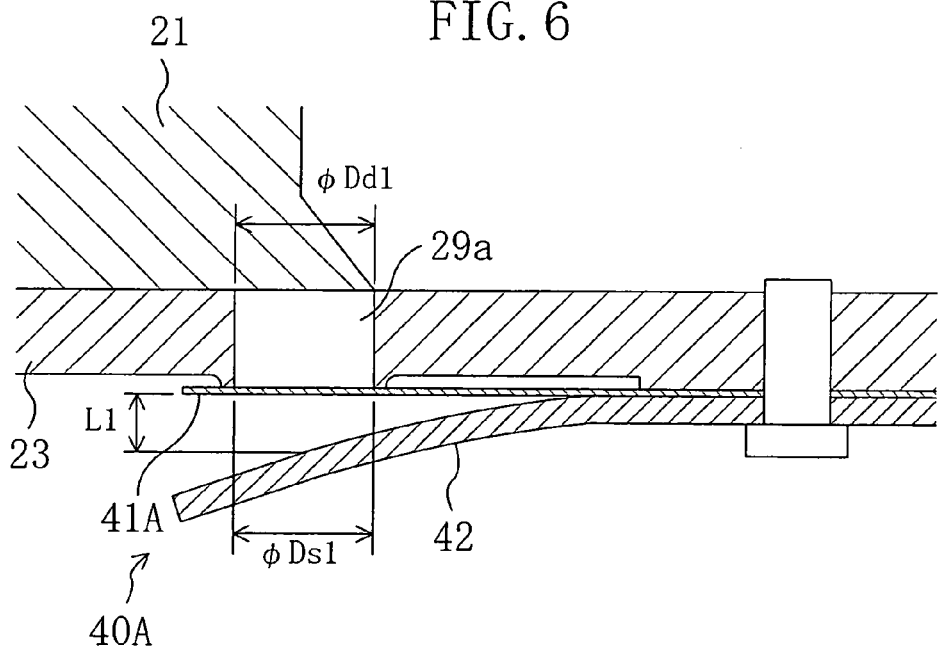
FIG. 6 is an enlarged cross section view showing a first valve mechanism of the discharge valve mechanism of the second embodiment.
Figure 7:
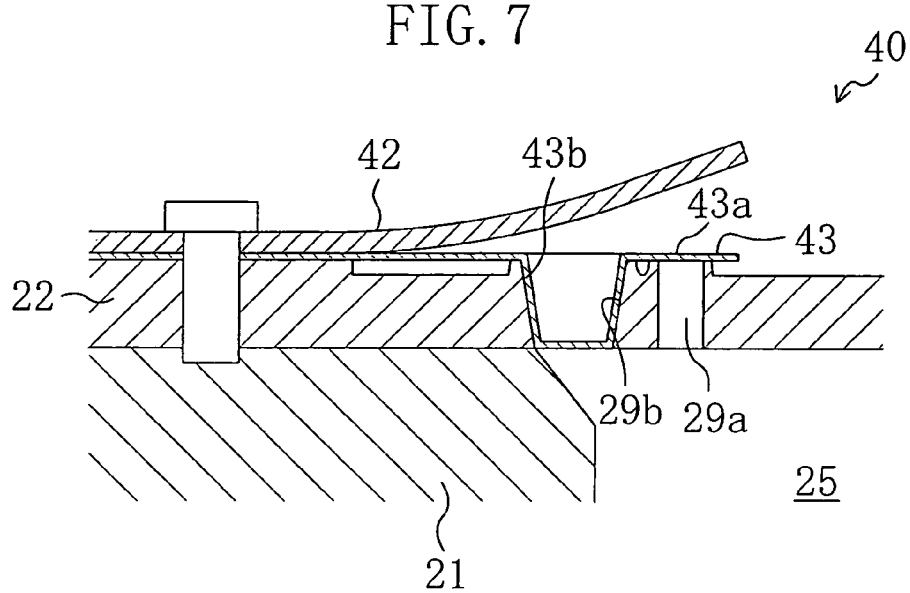
FIG. 7 is an enlarged cross section view showing a discharge valve mechanism in accordance with a third embodiment of the present invention.

As shown in FIG. 6, in the second embodiment, the first discharge opening (29a) is formed in the rear head (23), and the first valve mechanism (40A) is configured so that the first discharge opening (29a) is placed in the open or closed state by a first valve element (41A) which is a reed valve. In addition, as shown in FIG. 5, the second discharge opening (29b) is formed in the front head (22), and the second valve mechanism (40B) is configured so that the second discharge opening (29b) is placed in the open or closed state by a second valve element (41B) which is a poppet valve. The poppet valve (41B) is formed so that a part of the reed valve is fitted into the discharge opening (29b).

The first discharge opening (29a) has a discharge port diameter ($\phi Dd1$) and a seat diameter ($\phi Ds1$) which are the same in size. On the other hand, the second discharge opening (29b) is a tapered hole having a discharge port diameter ($\phi Dd2$) and a seat diameter ($\phi Ds2$), wherein it is set such that $\phi Dd2 < \phi Ds2$. The discharge port diameter ($\phi Dd1$) of the first discharge opening (29a) is smaller than the discharge port diameter ($\phi Dd2$) of the second discharge opening (29b), and the seat diameter ($\phi Ds1$) of the first discharge opening (29a) is smaller than the seat diameter ($\phi Ds2$) of the second discharge opening (29b). Furthermore, the lift amount (L1) of the first valve element (41A) is set greater than the lift amount (L2) of the second valve element (41B).

Since in the second embodiment the two discharge openings (29a, 29b) of the compression mechanism (20) are placed in the open or closed state by the first valve element (reed valve) (41A) and by the second valve element (poppet valve) (41B), respectively, this makes it possible to take advantage of the reed valve (41A) (i.e., its high response) and advantage of the poppet valve (41B) (i.e., its great flow rate). Because of this, it is possible to prevent the occurrence of overcompression during the small-displacement operation by placing the first valve element (41A) which is a high-response valve in the open state. On the other hand, during the large-displacement operation, not only the first valve element (41A) but also the second valve element (41B) is placed in the open state in order to obtain a sufficient opening area. This reduces the flow velocity of refrigerant, therefore reducing the resistance to discharge. Besides, even during the large-displacement operation, the reed valve (41A) as the first valve element is first placed in the open state, because of which the occurrence of overcompression in the early stage of discharge during the time that the rotary piston (24) makes a single revolution is prevented.

Furthermore, since the discharge port diameter ($\phi Dd1$) and the seat diameter ($\phi Ds1$) of the first valve mechanism (40A) are set smaller than the discharge port diameter ($\phi Dd2$) and the seat diameter ($\phi Ds2$) of the second valve mechanism (40B), this ensures that the opening/closing response of the first valve element (41A) which is a reed valve is enhanced during the small-displacement operation. In addition, since the lift amount (L2) of the second valve element (41B) which is placed in the open state during the large-displacement is set smaller than the lift amount (L1) of the first valve element (41A), this makes a lag in the closing of the second valve element (41B) and a refrigerant backflow into the compression chamber (25) caused by such a lag more unlikely to happen.

In the present embodiment, by a combination of a reed valve (the first valve element (41A)) and a poppet valve (the second valve element (41B)), it becomes possible to prevent not only the occurrence of overcompression during the small-displacement operation by virtue of the high-response reed valve (41A) but also the occurrence of overcompression during the large-displacement operation by the poppet valve (41B) which provides a sufficient opening area. Accordingly, the compressor (1) is improved in operating efficiency, regardless of the operating displacement. Especially, in the first and second valve mechanisms (40A, 40B), the relationship between the discharge port diameters ($\phi Dd1$) and ($\phi Dd2$), the relationship between the seat diameters ($\phi Ds1$) and ($\phi Ds2$), and the relationship between the lift amounts (L1) and (L2) are specified as above, whereby the effect of improving the operating efficiency of the compressor (1) is enhanced.

Third Embodiment of the Invention

A third embodiment of the present invention is an example which is characterized in that a single valve element has the function of a reed valve as well as the function of a poppet valve.

The discharge valve mechanism (40) of the third embodiment is disposed on the front head's (22) side, as in the first embodiment. In the discharge valve mechanism (40), the first discharge opening (29a) is a circular hole whose internal diameter is constant and the second discharge opening (29b) is formed into a tapered hole the internal diameter of which gradually increases from the inside towards the outside of the compression chamber (25). The first discharge opening (29a) is formed at a first location on the side of a leading end of a valve element (43) and the second discharge opening (29b) is formed at a second location nearer to the base end side than the first location.

Figure 8:
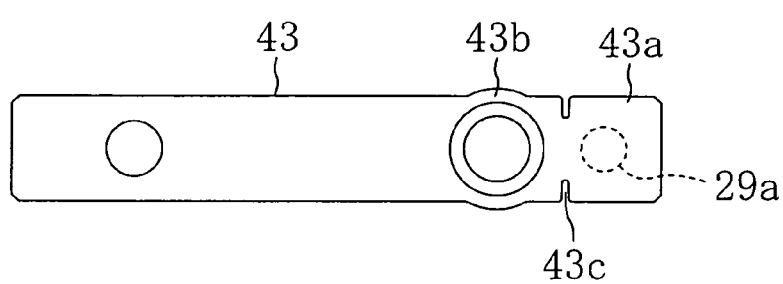
FIGS. 8(a) and 8(b) are top plan views of different discharge valves.
Figure 8:
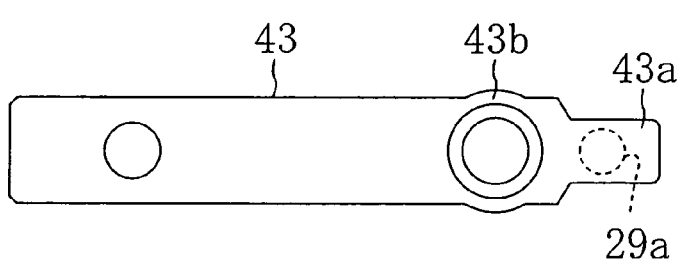

A portion of the valve element (43) corresponding to the first discharge opening (29a) is shaped like a flat plate. A portion of the valve element (43) corresponding to the second discharge opening (29b) is shaped like a frustum so as to engage into the second discharge opening (29b). In other words, the valve element (43) is constructed so that its leading end side portion and base end side portion function as a reed valve (43a) and as a poppet valve (43b), respectively. In addition, the valve element (43) includes a small-width part (43c) formed at a location situated between the first discharge opening (29a) and the second discharge opening (29b), as shown in FIG. 8(a). Alternatively, as shown in FIG. 8(b), the valve element (43) may be formed such that the width of a portion of the reed valve (43)

corresponding to the first discharge opening (29a) is narrowed. As a result of such arrangement, in the valve element (43), the bending strength of the reed valve (43a) of the leading end portion corresponding to the first discharge opening (29a) is smaller than the bending strength of the poppet valve (43b) situated nearer to the base end side than the reed valve (43a).

In the third embodiment, the lead end side of the valve element operates as the reed valve (43a) and is rendered more liable to bending in comparison with the base end side which is the poppet valve (43b). As a result of such arrangement, the opening/closing response of the first discharge opening (29a) during the small-displacement operation is improved and the occurrence of overcompression is prevented. In addition, the portion which becomes the base end side of the reed valve (43a) serves as the poppet valve (43b), thereby assuring a sufficient flow rate at the second discharge opening (29b) during the large-displacement operation. Accordingly, it becomes possible to achieve efficient operations over the operation range from small to large displacement while inhibiting the occurrence of overcompression losses.

In addition, the poppet valve (43b) is disposed nearer to the base end side than the reed valve (43a), and the lift amount of the poppet valve (43b) definitely becomes less than the lift amount of the reed valve (43a). Accordingly, the drop in response when the poppet valve (43b) is placed in the closed state is prevented.

Fourth Embodiment of the Invention

A fourth embodiment of the present invention is an example which is characterized in that the discharge valve mechanism (40) comprises two valve elements which are reed valves.

Figure 9:
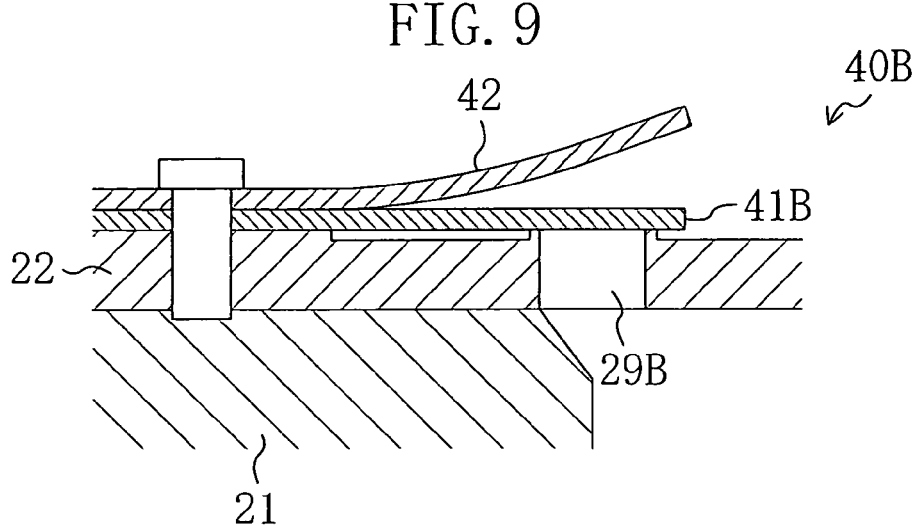
FIG. 9 is an enlarged cross section view showing a second valve mechanism of a discharge valve mechanism in accordance with a fourth embodiment of the present invention.
Figure 10:
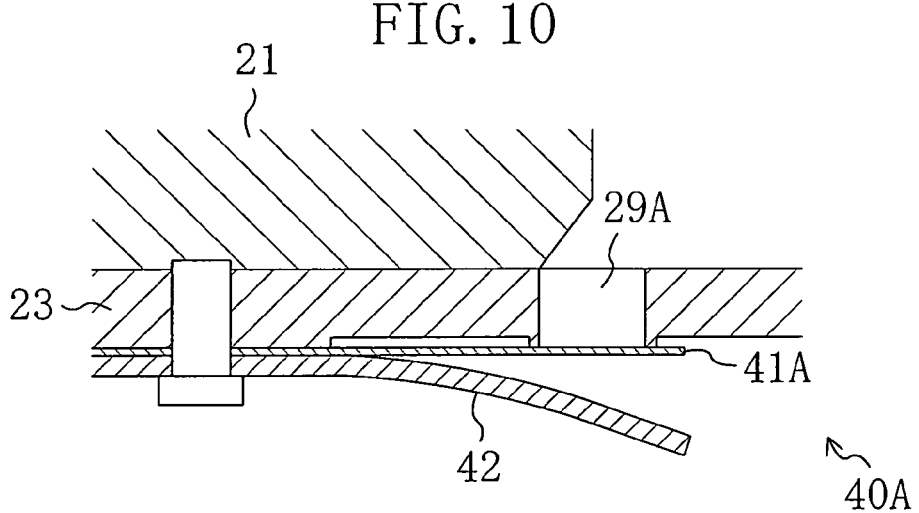
FIG. 10 is an enlarged cross section view showing a first valve mechanism of the discharge valve mechanism of the fourth embodiment.
Figure 11:
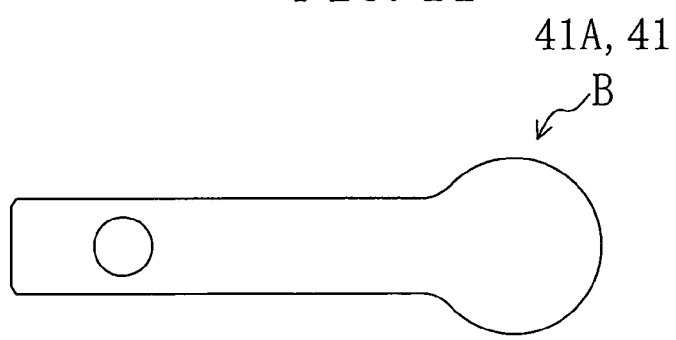
FIG. 11 is a top plan view of a discharge valve.

Like the second embodiment, the discharge valve mechanism (40) of the present embodiment comprises a first valve mechanism (40A) of FIG. 10 disposed on the rear head's (23) side, and a second valve mechanism (40B) of FIG. 9 disposed on the front head's (22) side. The first and second valve mechanisms (40A) and (40B) employ reed valves, i.e., a first valve element (41A) and a second valve element (41B). Each of the first and second valve elements (41A) and (41B) has a leading end portion with a circular arc contour and the leading end portion is thicker than the base end part, as shown in FIG. 11.

The first valve element (41A) is composed of a reed valve with a smaller thickness than that of the second valve element (41B). In other words, the bending strength of the first valve element (41A) is set lower than that of the second valve element (41B). In addition, in order to avoid a drop in response during the closing operation, preferably the lift amount of the second valve element (41B) is set smaller than the lift amount of the first valve element (41A).

In the fourth embodiment, at the time of the discharging of refrigerant from the compression chamber (25), the first valve mechanism (40A) is firstly placed in the open state and then the second valve mechanism (40B) is placed in the open state. Accordingly, it is ensured that the first valve mechanism (40A) which is a high response valve mechanism is placed in the open state during the small-displacement operation, thereby making it possible to achieve a reduction in the overcompression loss. In addition, since both of the valve mechanisms (40A, 40B) are placed in the open state during the large-displacement operation, this prevents the flow velocity from becoming excessively fast. Also in this case, it is possible to achieve a reduction in the overcompression loss.

Accordingly, the fourth embodiment, too, makes it possible to achieve efficient operations over the operation range from small to large displacement with a less overcompression loss, as in each of the foregoing embodiments.

OTHER EMBODIMENT OF THE INVENTION

With regard to the above-described embodiments, the configuration of the present invention can be modified as follows.

For example, in each of the above-described embodiments, the description has been made in terms of an example in which the present invention is applied to the rotary piston type compressor (1). However, the target of application of the present invention is not limited to such rotary piston type compressors, in other words the present invention is applicable to the compressor (1) of any other type as long as the discharge valve mechanism (40) is mounted in the compression mechanism (20). For example, the present invention is applicable to compressors of the oscillation piston type in which a blade, formed integrally with a piston, oscillates during turning of the piston.

In addition, in each of the foregoing embodiments, the description has been made in terms of a case where the operating displacement of the compressor is made variable by inverter-controlling the revolution speed of the electric motor (30). However, the operating displacement varying means is not limited to those employed in the foregoing embodiments.

For example, the present invention is applicable also to cases, such as where the revolution speed of an electric motor is controlled by making a change in the number of poles of the coil of the electric motor, and where the volume of a compression mechanism is made variable without controlling the revolution speed of an electric motor (for example, in the case where the stroke is made variable in a reciprocate type compression mechanism). As described above, the present invention is effective for compressors in which the amount of refrigerant flowing outwardly from a discharge opening varies according to the operating conditions.

INDUSTRIAL APPLICABILITY

As has been described above, the present invention is useful for compressors in which a discharge valve mechanism is mounted in a compression mechanism.

What is claimed is:

1. A variable displacement compressor comprising:
   a compression mechanism and a drive mechanism operable to activate said compression mechanism and in which said compression mechanism includes a discharge valve mechanism,
   said discharge valve mechanism being configured such that two discharge openings are formed in said compression mechanism and are placed in an open or closed state by a reed valve, and each of said discharge openings is formed at a respective location between a base end side and a leading end side of said reed valve,
   a first portion of said reed valve corresponding to one of said discharge openings on the leading end side has a bending strength set smaller than that of a second portion of said reed valve corresponding to another one of said discharge openings on the base end side, and said reed valve including a small-width part of smaller width dimension between said second portion corresponding to said discharge opening on the base end side and said first portion corresponding to said discharge opening on the leading end side.

2. A variable displacement compressor comprising:

a compression mechanism and a drive mechanism operable to activate said compression mechanism and in which said compression mechanism includes a discharge valve mechanism, said discharge valve mechanism having a first valve mechanism including a reed valve operable to place a discharge opening in an open or closed state, and a second valve mechanism including a poppet valve operable to place another discharge opening in an open or closed state.

3. The variable displacement compressor according to claim 2, wherein said first valve mechanism has a first discharge port diameter and a first seat diameter and said second valve mechanism has a second discharge port diameter and a second seat diameter, said first discharge port diameter is less than said second discharge port diameter and said first seat diameter is less than said second seat diameter, and said reed valve has a first lift amount and said poppet valve has a second lift amount, said second lift amount is less than said first lift amount.

4. A variable displacement compressor comprising:

a compression mechanism and a drive mechanism operable to activate said compression mechanism and in which said compression mechanism includes a discharge valve mechanism, said discharge valve mechanism being configured such that a plurality of discharge openings are placed in an open or closed state by a plate-like valve element, and each of said discharge openings is formed at a respective location between a base end side and a leading end side of said valve element, a first portion of said valve element corresponding to one of said discharge openings on the leading end side has a bending strength set smaller than that of a second portion of said valve element corresponding to another one of said discharge openings on the base end side, and said first portion of said valve element corresponding to one of said discharge openings on the leading end side being formed as a reed valve while said second of said valve element corresponding to another one of said discharge openings on the base end side being formed as a poppet valve.

5. The variable displacement compressor as set forth in claim 4, wherein two discharge openings are formed in said compression mechanism, and said valve element includes a small-width part of smaller width dimension between said second portion of said valve element corresponding to said discharge opening on the base end side and said first portion of said valve element corresponding to said discharge opening on the leading end side.

6. The variable displacement compressor as set forth in claim 4, wherein two discharge openings are formed in said compression mechanism, and said first portion of said valve element corresponding to said discharge opening on the leading end side has a smaller width dimension than that of said second portion of said valve element corresponding to said discharge opening on the base end side.

7. A variable displacement compressor comprising:

a compression mechanism and a drive mechanism operable to activate said compression mechanism and in which said compression mechanism includes a discharge valve mechanism, said discharge valve mechanism having a first valve mechanism including a first valve element operable to place a discharge opening in an open or closed state, and a second valve mechanism including a second valve element operable to place another discharge opening in an open or closed state, and both said first valve element and said second valve element are formed by reed valves and said first valve element having a bending strength set smaller than that of said second valve element.

8. The variable displacement compressor as set forth in claim 7, wherein said first valve element has a smaller thickness than that of said second valve element.

* * * * *

UNITED STATES PATENT AND TRADEMARK OFFICE
CERTIFICATE OF CORRECTION

PATENT NO. : 7,059,344 B2
APPLICATION NO. : 10/517144
DATED : June 13, 2006
INVENTOR(S) : Shibamoto et al.

It is certified that error appears in the above-identified patent and that said Letters Patent is hereby corrected as shown below:

On the Title page change the listing of [75] Inventors from

"[75] Inventors: Yoshitaka Shibamoto, Sakai (JP);
Hirofumi Higashi, Sakai (JP);
Yoshinori Asano, Kusatsu (JP);
Takashi Shimizu, Sakai (JP);
Kazutaka Hori, Sakai (JP)"

to

-- [75] Inventors: Yoshitaka Shibamoto, Osaka (JP);
Hirofumi Higashi, Osaka (JP);
Yoshinari Asano, Shiga (JP);
Takashi Shimizu, Osaka (JP);
Kazutaka Hori, Osaka (JP) --

Signed and Sealed this

Twenty-sixth Day of September, 2006

JON W. DUDAS
*Director of the United States Patent and Trademark Office*